(12) United States Patent
Bilchev

(10) Patent No.: US 7,076,060 B1
(45) Date of Patent: Jul. 11, 2006

(54) CIPHER

(75) Inventor: George Bilchev, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/830,180

(22) PCT Filed: Nov. 23, 1999

(86) PCT No.: PCT/GB99/03891

§ 371 (c)(1),
(2), (4) Date: Apr. 23, 2001

(87) PCT Pub. No.: WO00/31916

PCT Pub. Date: Jun. 2, 2000

(30) Foreign Application Priority Data

Nov. 23, 1998 (GB) .................................. 9825644

(51) Int. Cl.
*H04L 1/06* (2006.01)
*H04L 1/04* (2006.01)

(52) U.S. Cl. ............................ 380/37; 380/36; 380/37; 703/13; 703/14; 708/200

(58) Field of Classification Search .................. 380/37, 380/42, 275, 29, 259, 265, 268
See application file for complete search history.

(56) References Cited

U.S. PATENT DOCUMENTS

| | | | | |
|---|---|---|---|---|
| 4,316,055 A | * | 2/1982 | Feistel | 380/37 |
| 4,520,232 A | * | 5/1985 | Wilson | 380/28 |
| 4,984,271 A | | 1/1991 | Goto | |

FOREIGN PATENT DOCUMENTS

| | | |
|---|---|---|
| EP | 0267647 A2 | 5/1988 |
| WO | WO 89/07375 | 8/1989 |

OTHER PUBLICATIONS

Patent Abstracts of Japan, vol. 107, No. 456 (E-1418), Aug. 20, 1993, & JP 05 102960 A (NEC Corp), Apr. 23, 1993.
Nandi et al, "Theory and Applications of Cellular Automata In Cryptography", IEEE Transactions on Computers, New York, vol. 43, No. 12, Dec. 1, 1994, pp. 1346-1356, XP000484159.

* cited by examiner

*Primary Examiner*—Kim Vu
*Assistant Examiner*—Ponnoreay Pich
(74) *Attorney, Agent, or Firm*—Nixon & Vanderhye P.C.

(57) ABSTRACT

A cipher for enciphering and deciphering a signal includes a plurality of sequentially coupled cipher units, each cipher unit being operable to carry out a reversible operation on the signal. The couplings between cipher units can be randomly configured using a cipher code. The cipher code can be secretly shared between the encipher and decipher. A signal which is enciphered using this technique is thus deciphered using a randomly selected cipher circuit as described by the cipher code.

75 Claims, 17 Drawing Sheets

ONE FREDKIN'S GATE     ANOTHER FREDKIN'S GATE gate 1          gate 2                          gate M
01000010101001  110001111011 ...  001011111000  110100101110

CIPHER

BACKGROUND

1. Field of the Invention

This application is a national state entry of PCT/GB99/03891 filed Nov. 23, 1999, which claims priority from British application 9825644.9 filed Nov. 23, 1998.

The present invention generally relates to a cipher and in particular to a cipher in which the secret cipher code which is required for both enciphering and deciphering is information which describes the process used to carry out enciphering.

2. Related Art

Two commonly used types of cryptographic algorithms are private key algorithms which use a single shared key and public key algorithms which use two keys: a public key and a private key.

In these prior art algorithms the encryption process used is fixed although the particular encryption process can be selectable by user e.g. by using a particular encryption program (algorithm). The security of the encryption is provided by the key which is secretly exchanged between the encrypter operator and decrypter operator. Such currently implemented ciphers are not easily scalable since they are defined for a specific block size and key size. In many instances the key is not big enough e.g. many ciphers have only 64 bit keys.

BRIEF SUMMARY

In accordance with a first aspect, the present invention provides encipher apparatus for enciphering a signal, comprising:

forming means for receiving the signal to be enciphered and for outputting the signal as a sequence of data blocks, each having a first predetermined number of bits;

a plurality of encipher functional modules sequentially coupled to operate sequentially on the sequence of data blocks from the forming means; and configuring means, wherein each encipher functional module comprises a module input, a module output, and a respective data processing unit having a parallel input and a corresponding parallel output and being arranged to perform a respective reversible process upon a set of bits at its parallel input and to produce at its corresponding parallel output a corresponding enciphered set of bits, and is operable under the control of the configuring means to couple a respective predetermined set of the bits of a data block received at its module input to the parallel input of its data processing unit and to provide at its module output an enciphered data block in which said respective predetermined set of bits is replaced by the corresponding enciphered set of bits produced at the parallel output of its data processing unit.

Another aspect of the present invention provides a method of enciphering a signal, the method comprising:

receiving the signal to be enciphered and forming the signal into a sequence of data blocks, each having a first predetermined number of bits;

applying the sequence of data blocks to a plurality of encipher functional modules sequentially coupled to operate sequentially on the sequence of data blocks, each encipher functional module comprising a module input, a module output, and a respective data processing unit having a parallel input and a corresponding parallel output and being arranged to perform a respective reversible process upon a set of bits at its parallel input and to produce at its corresponding parallel output a corresponding enciphered set of bits; and configuring each encipher functional module to couple a respective predetermined set of the bits of a data block received at its module input to the parallel input of its data processing unit and to provide at its module output an enciphered data block in which said respective predetermined set of bits is replaced by the corresponding enciphered set of bits produced at the parallel output of its data processing unit.

Thus an exemplary embodiment of the present invention provides a universal cipher which is capable of implementing any cipher process. The encryption which is carried out on the signal is dependent upon the respective predetermined sets of bits. The respective predetermined sets of bits are configurable without changing the data processing unit of the cipher units. This configuration is freely selectable and is preferably selected randomly or pseudo-randomly and automatically for the usual security reasons to prevent any element of predictability.

In one embodiment the encipher functional modules, also referred to generically as cipher units, are identical and thus perform identical reversible operations. The invention does however encompass the use of a plurality of types of cipher units wherein the sequential pattern of the different types is information that must be shared to allow deciphering of the signal enciphered using the pattern.

The cipher units can be implemented in many different ways such as a reversible circuit either implemented in logic gates or in logic steps performed by a computer, analog circuitry, or optical elements. In fact, the cipher units can be implemented by any physical process which is reversible.

A further aspect of the present invention provides decipher apparatus for deciphering a signal, comprising:

forming means for receiving the signal to be deciphered and for outputting the signal as a sequence of data blocks, each having a first predetermined number of bits;

a plurality of decipher functional modules sequentially coupled to operate sequentially on the sequence of data blocks from the forming means; and configuring means, wherein each decipher functional module comprises a module input, a module output, and a respective data processing unit having a parallel input and a corresponding parallel output and being arranged to perform a respective reversible process upon a set of bits at its parallel input and to produce at its corresponding parallel output a corresponding enciphered set of bits, and is operable under the control of the configuring means to couple a respective predetermined set of the bits of a data block received at its module input to the parallel input of its data processing unit and to provide at its module output a deciphered data block in which said respective predetermined set of bits is replaced by the corresponding deciphered set of bits produced at the parallel output of its data processing unit.

Another aspect of the present invention provides a method of deciphering an enciphered signal, the method comprising:
receiving the signal to be deciphered and outputting the signal as a sequence of data blocks, each having a first predetermined number of bits;
applying the sequence of data blocks to a plurality of decipher functional modules sequentially coupled to operate sequentially on the sequence of data blocks, each decipher functional module comprising
a module input,
a module output, and a respective data processing unit having a parallel input and a corresponding parallel output and being arranged to perform a respective reversible process upon a set of bits at its parallel input and to produce at its corresponding parallel output a corresponding enciphered set of bits; and
configuring each decipher functional module to couple a respective predetermined set of the bits of a data block received at its module input to the parallel input of its data processing unit and to provide at its module output an deciphered data block in which said respective predetermined set of bits is replaced by the corresponding deciphered set of bits produced at the parallel output of its data processing unit.

In one embodiment the cipher units are identical and carry out identical operations on the enciphered signal.

The use of reversible cipher units in both the encipher and decipher enable the configuration of the units to be the same although the implementation will be reversed. It is this reversibility which allows the use of information describing the cipher process, referred to as cipher design description, to be used secretly between the encipher and decipher. In other words, instead of a secret key to be shared by the sender and receiver of an encrypted message, a cipher design description which describes the cipher process is shared instead.

Thus the invention is similar to the conventional symmetric cryptography technique except that there is no single shared key but instead a single shared cipher design description containing information describing the cipher process.

In a similar manner to use of a private key, the cipher design description can be determined by either party in a two-party communication of an encrypted signal. In other words, either the recipient of an encrypted signal can request for the cipher design description to be used and secretly pass this to the party for use in transmitting the encrypted signal, or the party transmitting the encrypted signal can secretly inform the recipient of the cipher design description to be used to decrypt the signal.

The invention is equally applicable to the encryption of a signal which is not transmitted and which is instead stored securely e.g. the encryption and storage of data in a computer to prevent unauthorised access. In this example there need only be one party.

Because the cipher units are reversible, the encipher apparatus and decipher apparatus can be constituted by a single apparatus. Thus, for duplex communication of an encrypted signal or for the storage of encrypted data for retrieval and decryption it is possible for the same cipher units to be used but in reverse order for deciphering.

In one embodiment the reversible process of at least one of said data processing units is a switching operation controlled by at least one of the set of bits received at its parallel input.

Such a data processing unit can be implemented as a reversible gate such as a Fredkin's gate or an AND/NAND gate. Such gates can be implemented in logic either as logic gates such as a programmable circuit, in particular a programmable logic gate array, or as logic steps implementing the gates in a computer program.

An advantage of this invention is that it is inherently scalable since the number of cipher units can be varied dependent upon the configuration. Further, the size of the data block can be varied. This will also depend upon the configuration of the cipher unit.

Conveniently, ciphers are usually implemented digitally as a computer program. The programmability of a general purpose computer provides the facility for a universal cipher. Since a computer is capable of implementing a reversible computational process which implements a one-to-one mapping, and since general purpose computers are available which can be programmed to carry out any reversible computational process, any reversible computational process can be implemented thus implementing any one-to-one mapping. Any general purpose reversible computer can be used as a universal cipher. The use of a computer program to implement the reversible process further enables a user to select the type of reversible process to be implemented.

Since apparatus of the present invention can be implemented on a general purpose computer by a suitable program, the present invention can be embodied as a storage medium storing instructions, for controlling a processor e.g. a floppy disc, CD-ROM, smartcard, and programmable memory Further, since the computer program can be transmitted over a network to be received and implemented on a computer, the present invention can be embodied as a signal carrying the processor implementable instructions. Apparatus of the present invention can also be embodied as a storage medium storing logic to configure a programmable logic gate array to carry out an encipher method or a decipher method of the present invention.

BRIEF DESCRIPTION OF THE DRAWINGS

Embodiments of the present invention will now be described with reference to the accompanying drawings, in which.

DETAILED DESCRIPTION OF EXEMPLARY EMBODIMENTS

Figure 1:
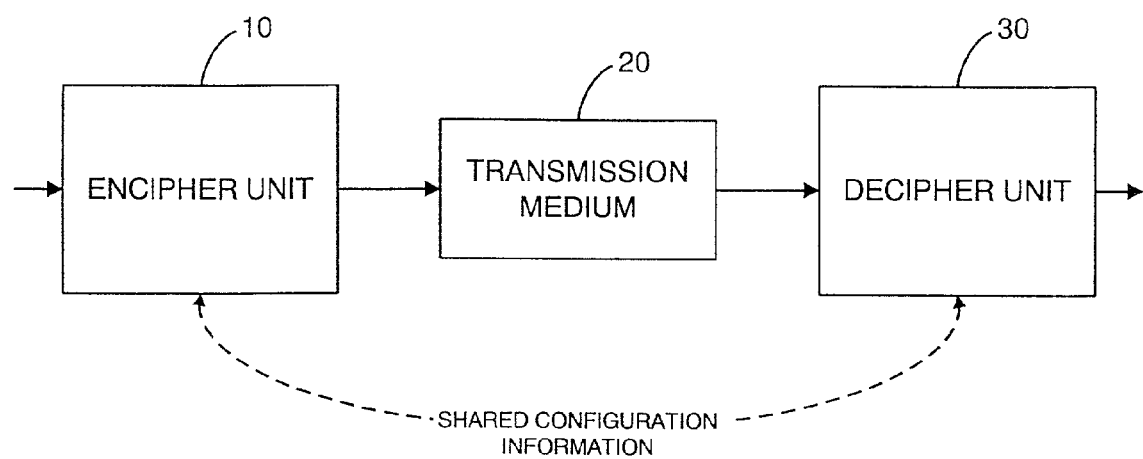
FIG. 1 is a schematic illustration of a cipher system.

Referring now to the drawings, FIG. 1 illustrates a cipher system in general wherein an encipher unit 10, hereinafter referred to as an encipher apparatus, generates an enciphered or encrypted signal using shared configuration information, referred to as the cipher design description. The cipher design description is used to configure the encipher apparatus 10. The encrypted signal is then transmitted by a transmission medium 20 to a recipient decipher unit 30, hereinafter referred to as a decipher apparatus, which also has the shared cipher design description. The decipher apparatus 30 is configured in accordance with the cipher design description and operates the reverse of the process carried out by the encipher apparatus 10 to thereby decipher the signal.

Although in this embodiment a transmission medium 20 is illustrated, the transmission medium could simply comprise a storage medium on which the encrypted data is stored. Thus the operator generating the encrypted signal and the operator receiving the encrypted signal may in fact be the same.

Figure 2:
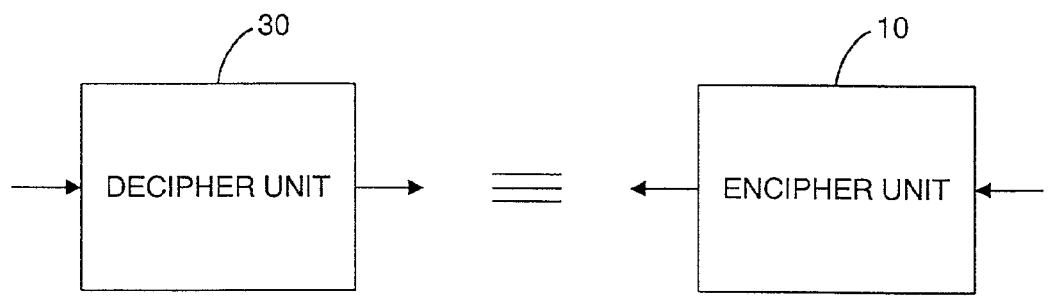
FIG. 2 is a schematic illustration of the reversibility of the cipher.

FIG. 2 schematically illustrates the reversibility of a cipher apparatus to act either as a decipher apparatus 30 or an encipher apparatus 10, and the term cipher apparatus is used herein as meaning an apparatus capable of acting in either mode.

Figure 3:
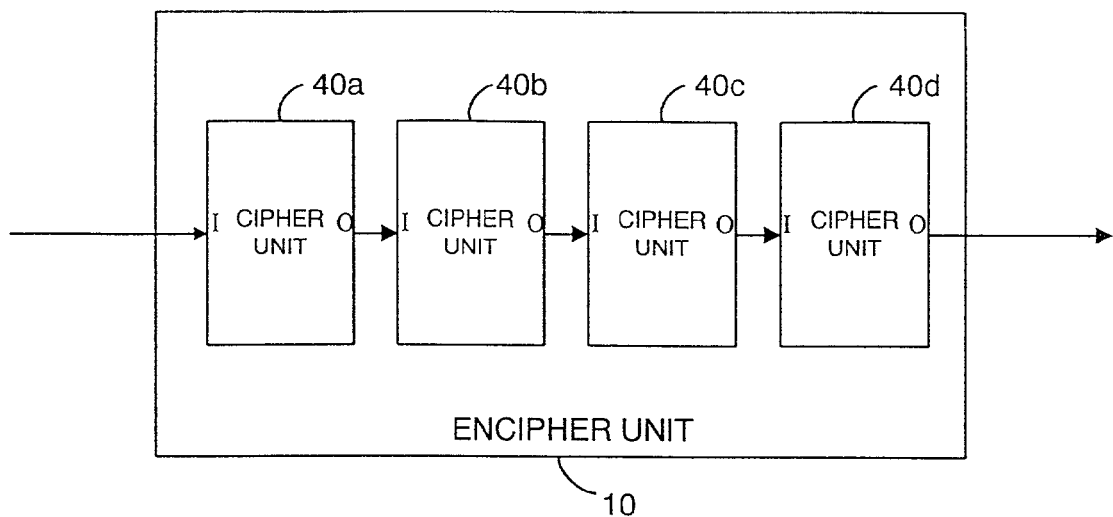
FIG. 3 is a schematic illustration of an encipher apparatus of the cipher system of FIG. 1.

FIG. 3 illustrates in more detail the encipher apparatus 10 which is comprised of cipher units 40a to 40d. Although in this embodiment four cipher units are illustrated, in a practical embodiment this would typically be at least four times the block size e.g. for a block size of 128 bits the number of cipher units is at least 512. The number will however depend an the level of security desired. As can be seen in FIG. 3 the input signal is received at the input I of the cipher unit 40a, which provides an output signal to the input I of the cipher unit 40b, and so on, i.e. the cipher units 40a to 40d are coupled sequentially.

Figure 4:
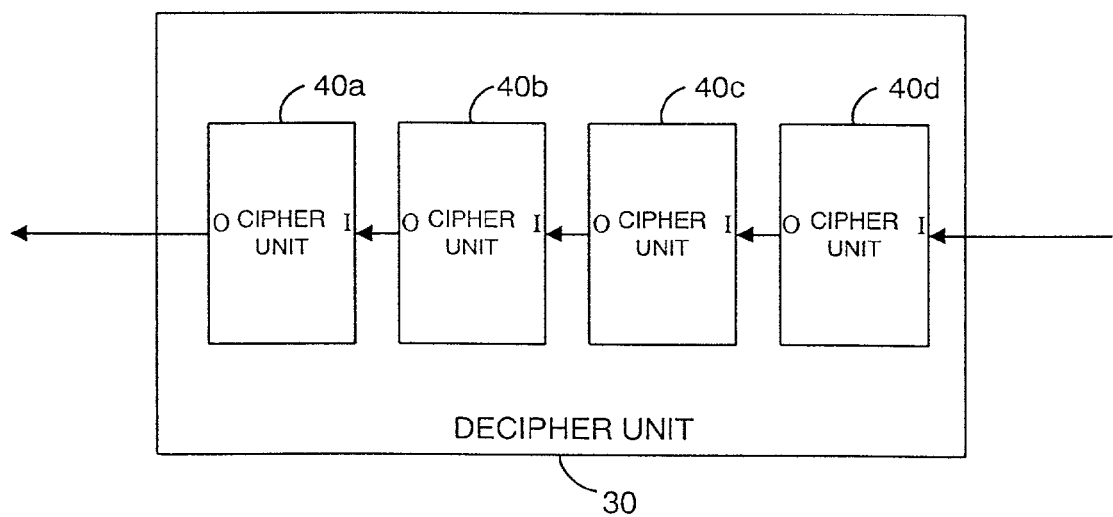
FIG. 4 is a schematic illustration of a decipher apparatus of the cipher system of FIG. 1.

FIG. 4 illustrates a decipher apparatus 30 in more detail. The decipher apparatus 30 comprises the same set of cipher units 40a to 40d as in the encipher apparatus 10, but they are connected in reverse sequential order, i.e. from 40d to 40a. Thus, in order to decipher the enciphered signal, it is passed in sequence through the cipher units 40d to 40a, i.e. the signal to be deciphered is received at the input I of the cipher unit 40d, which provides an output signal to the input I of the cipher unit 40c, and so on.

Figure 5:
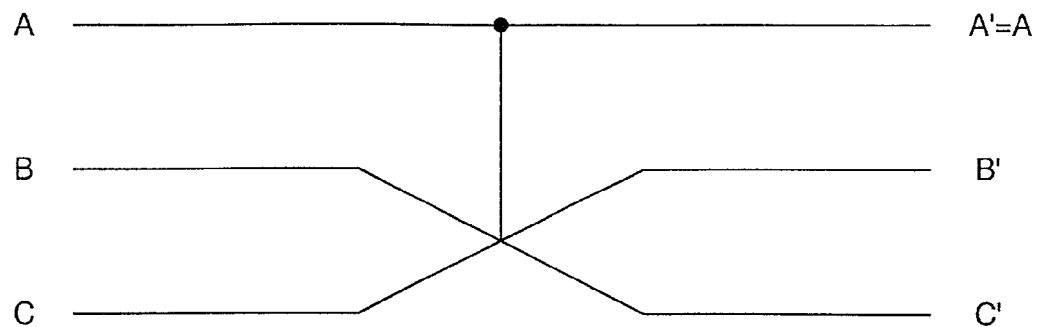
FIG. 5 is a schematic illustration of a Fredkin's gate.

A specific implementation of the cipher system will now be described in which the cipher unit is implemented using a data processing unit or circuit known as a Fredkin's gate. Such a gate is illustrated in FIG. 5. It is well known that a Fredkin's gate is both reversible (i.e. a cipher unit implemented by a Fredkin's gate can be run backwards to uncompute) and universal (i.e. can be used to design a cipher unit that implements all one-to-one mappings).

In the Fredkin's gate as illustrated in FIG. 5, the input A is used to control the exchange of data on inputs B and C. Thus the Fredkin's gate performs a controlled exchange operation. If A=1, B and C are not exchanged i.e. B'=B and C'=C. If however, A=0, B'=C and C'=B. In mathematical notation B'=AB+$\overline{A}$C and C'=$\overline{A}$B+AC.

The Fredkin's gate is a conservative logic gate i.e. it preserves the numbers of 0's and 1's from the input to the output. In a cipher system this is undesirable, thus in order to break the conservation, NOT gates are selectively applied to the outputs to invert them. The selective inversion are operations which are inherently reversible and thus do not affect the reversibility of the circuit.

Figure 6:
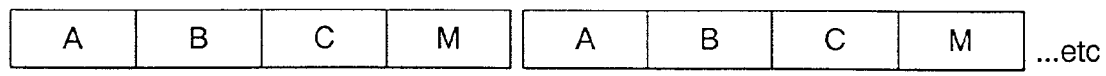
FIG. 6 is a schematic illustration of a cipher unit design description for the configuration of a Fredkin's gate forming the basis of a cipher unit of the apparatus of FIGS. 3 and 4.

Having selected the type of reversible circuit used as the cipher unit, it is then necessary to determine a cipher unit design description to describe the arrangement of the circuits. FIG. 6 illustrates one such cipher unit design description wherein each Fredkin's gate is described by a respective four segment cipher unit design description. Each of the first three segments describe input pin numbers to which the three inputs A, B and C of a gate are coupled, and, correspondingly, the output pin numbers to which the three outputs A', B' and C' of that gate are coupled. The last segment, referred to as the mask M, is used to encode a description of the presence or the absence of inverters on each of the three outputs A', B' and C'.

Consider an encipher process in which it is decided that the input signal is to be enciphered in 8 bit blocks. The input data thus comprises a 8 bit array indexed from 000 (first bit) to 111 (eighth bit). Each segment of the cipher unit design description for the gate of an encipher unit thus comprises a 3 bit code. For example the sequence of four segments 010 111 110 110 defines a gate with A of the gate attached to pin 3 (010) of the 8 pin input of that encipher unit (numbered from pin 1 to pin 8), B attached to pin 8 (111) of the 8 pin input and C attached to pin 7 (110) of the 8 pin input. The last segment, mask M, defines that outputs A' and B' are passed through NOT gates i.e. inverted. Thus the binary values at pins 3, 7, and 8 of the input are processed by the Fredkin's gate in accordance with its internal logic as defined above and are output at pins 3, 7, and 8 of the 8 pin output coupled through that encipher unit to corresponding output pins, and the binary values at pins 1, 2, 4, 5, and 6 are coupled through that encipher unit to corresponding output pins without being processed by the Fredkin's gate. The 8 bit signal as modified by the first encipher unit is then used as an input to the second encipher unit and so on.

Figures 7, 8:
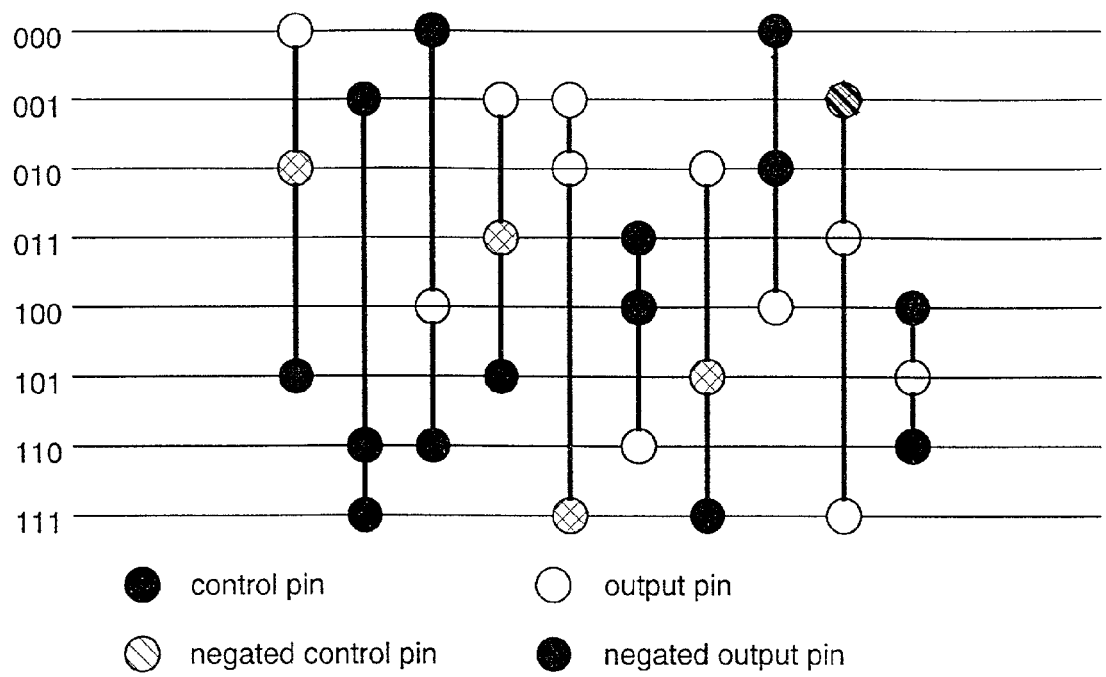
FIG. 7 is a schematic illustration of an encipher apparatus using Fredkin's gates.
FIG. 8 is an illustration of the cipher design description for the encipher apparatus of FIG. 7.

FIG. 7 illustrates schematically an encipher apparatus having an arrangement of ten cipher units comprised of Fredkin's gates and NOT gates and FIG. 8 illustrates the cipher design description used to describe the encipher apparatus.

As can clearly be seen the cipher unit design description simply comprises a digital code. The digital code is defined as $((3 \times \log_2 N)+3)$ bits and each such digital code defines a cipher unit where N is the number of input bits i.e. the data block size. The total number of bits of a cipher design description for defining an encipher apparatus is $M((3\times \log_2 N)\div 3)$ where M is the number of cipher units. Whilst it is possible to allow a user to select a code freely by for example choosing a "password" in ASCII code which can be translated to binary (e.g. for the 8 bit input, 10 gate example in FIG. 7, a 15 character 8 bit ASCII password could be used to describe the encipher apparatus), it is preferable for the usual security reasons to randomly generate a code which describes a random configuration of the gates of the cipher units.

In this example, in order to encrypt the signal it is passed from left to right through the cipher units, i.e. from cipher unit 40a to cipher unit 40b, and so on. In order to decrypt the signal it is passed from right to left, i.e. from cipher unit 40d to cipher unit 40c, and so on, as described above. Thus in decryption as the signal is input into each cipher unit formed of a Fredkin's gate the respective mask M defines for each of the three input pins defined by the segment codes of the corresponding cipher unit design description whether the bit value on that pin is to be inverted before being operated upon by the Fredkin's gate.

It is possible for some of the cipher units to be implemented in parallel so long as their respective Fredkin's gate inputs are not coincident, i.e. the cipher unit design descriptions for these cipher units do not have a common 3 bit segment code.

Figure 9:
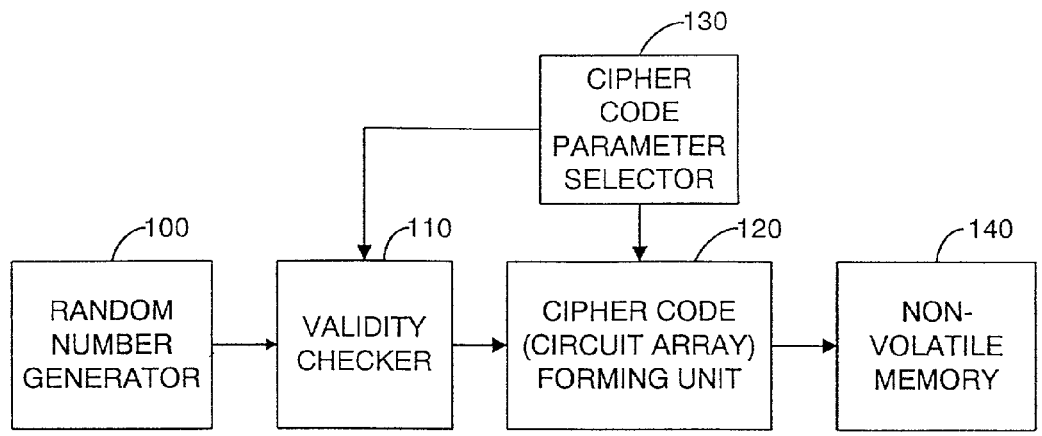
FIG. 9 is a functional diagram of a cipher design description generator.

FIG. 9 is a functional diagram of a cipher unit design description generating apparatus. A random number generator 100 generates a random number to be used to form the cipher unit design description. This is input through a validity checker 110 which checks whether the random number is valid, i.e. each of the segment codes must be unique, else two or more of the gate inputs will be coupled to the same input pin. The validity checker 110 requires information on the block size in order to do this check.

The random number is then input into the cipher design description (circuit array) forming unit 120, constituting an encoding means of the present invention, in order to build the cipher design description describing the circuit array. The cipher design description forming unit 120 also receives an input from the cipher design description parameter selector 130, constituting a second selection means and also a third selection means of the present invention, which is operable by a user to select the number of bits or cipher units to be implemented in the cipher system, and to select the data block size. Also, in a general purpose computer, it is possible to select the type of reversible gates to be used, and in this case the computer constitutes a first selection means of the present invention. Since there is however a limited number of possible types of gates currently known which can be implemented reversibly, allowing such a selection does not greatly increase the level of security at present.

Once the cipher design description has been formed it is then stored in a non-volatile memory 140 for use in enciphering and deciphering data. If data is to be transmitted between two parties, the cipher design description must be secretly shared. Where there has been selection of parameters in building the cipher design description i.e. the number of gates, the block size and the type of gates, this information will also need to be shared so that the cipher design description can be used properly to implement a cipher apparatus for both encryption and decryption.

Figure 10:
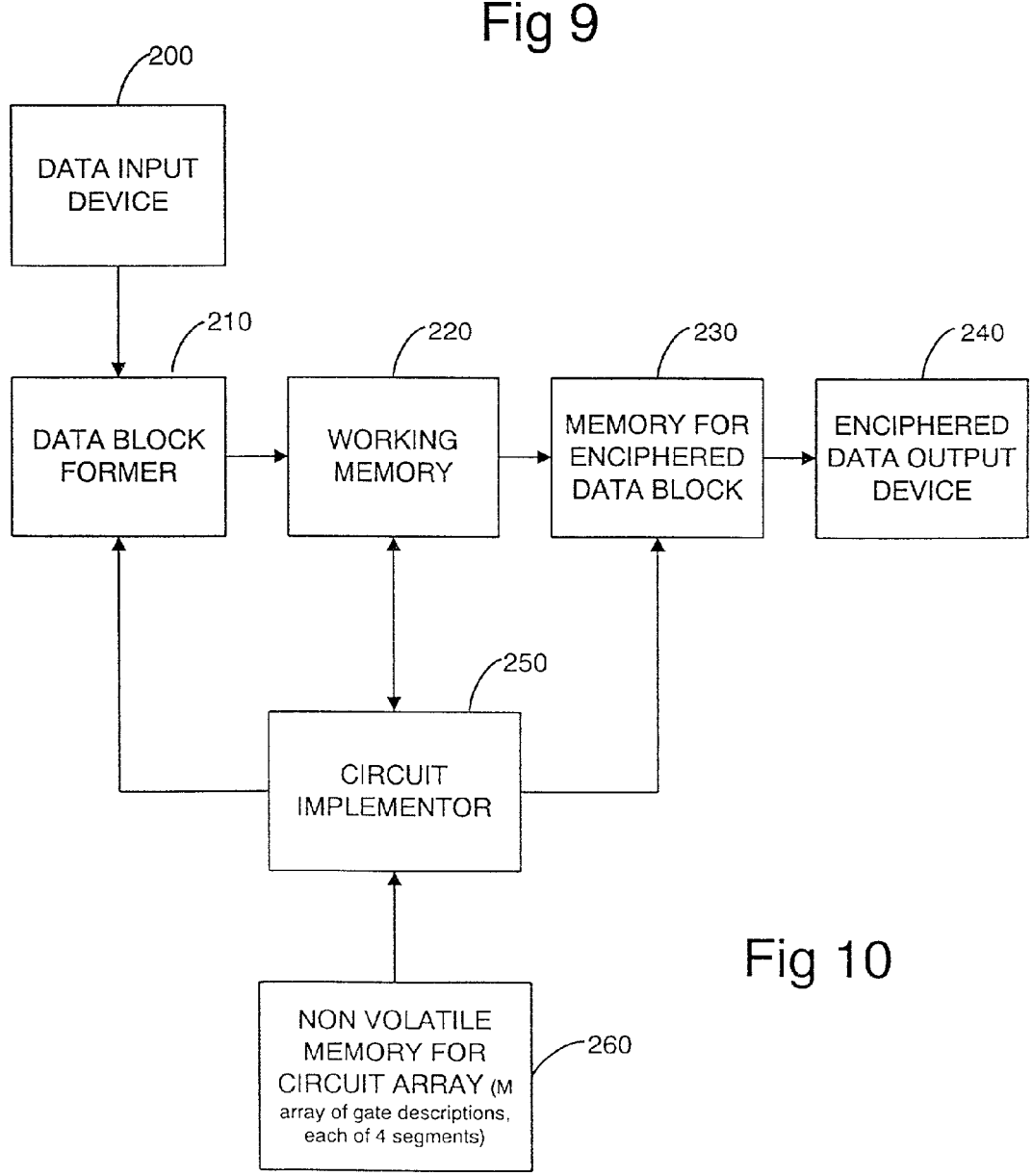
FIG. 10 is a functional diagram of an encipher apparatus.

FIG. 10 is a functional diagram of the encipher apparatus. A signal to be enciphered is input by the data input device 200. This is then passed to a data block former 210 which forms the input signal into blocks of data which can be sequentially passed through the encipher apparatus. The first block of data is then passed into the working memory 220 as a string of N bits where N is the block size. A circuit implementor, also referred to as a cipher apparatus implementor, 250 then implements the cipher apparatus in accordance with the circuit array stored in the non-volatile memory 260. The circuit array comprises a M array of gate descriptions, where each gate description comprises four segments (as illustrated in FIG. 6). The cipher apparatus implementor 250 will operate on the data block in the working memory 220 to implement each of the cipher units sequentially. Cipher apparatus implementor 250 will therefore control the data block former 410 to input a block of data into the working memory 220 when it is ready to operate on it. Once the enciphering operation has been completed on the data block in the working memory 220, the cipher apparatus implementor 250 controls the passage of the data block from the working memory 220 into a memory 230. The enciphered data block can then be passed out block-by-block into a data output device 240 which can either output the enciphered data block block-by-block or can wait until all of the data blocks are enciphered and output the complete enciphered signal.

Figure 11:
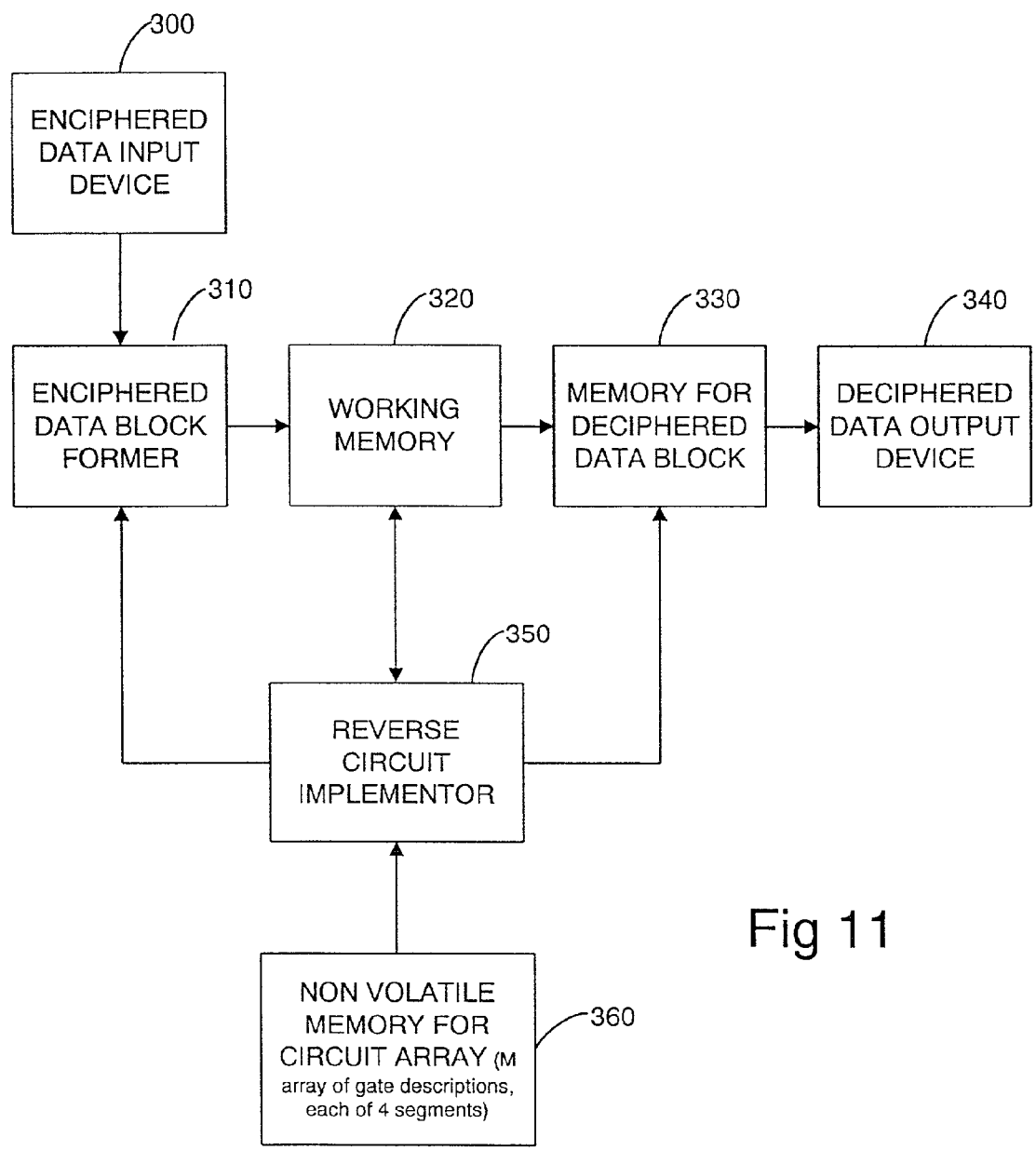
FIG. 11 is a functional diagram of a decipher apparatus.

FIG. 11 is a functional diagram of the decipher apparatus in accordance with an embodiment of the present invention. Enciphered data is received by the enciphered data input device 300 and is formed into enciphered data blocks by the enciphered data block former 310. The passage of enciphered data blocks into a working memory 320 is then controlled by a reverse circuit implementor 350. When a data block is in the working memory 320 the reverse circuit implementor, also referred to as a reverse cipher apparatus implementor, 350 implements the decipher apparatus in accordance with the circuit array stored in the non-volatile memory 260 in reverse. Once all of the cipher units defined by the circuit array have been implemented in reverse and thus the enciphered data block has been deciphered, it is output into the memory 330 under the control of the reverse cipher apparatus implementor 350. The deciphered data block can then be output to the output device 340 which can then either output each of the data blocks sequentially or wait until the complete signal has been deciphered before outputting it.

Figure 12:
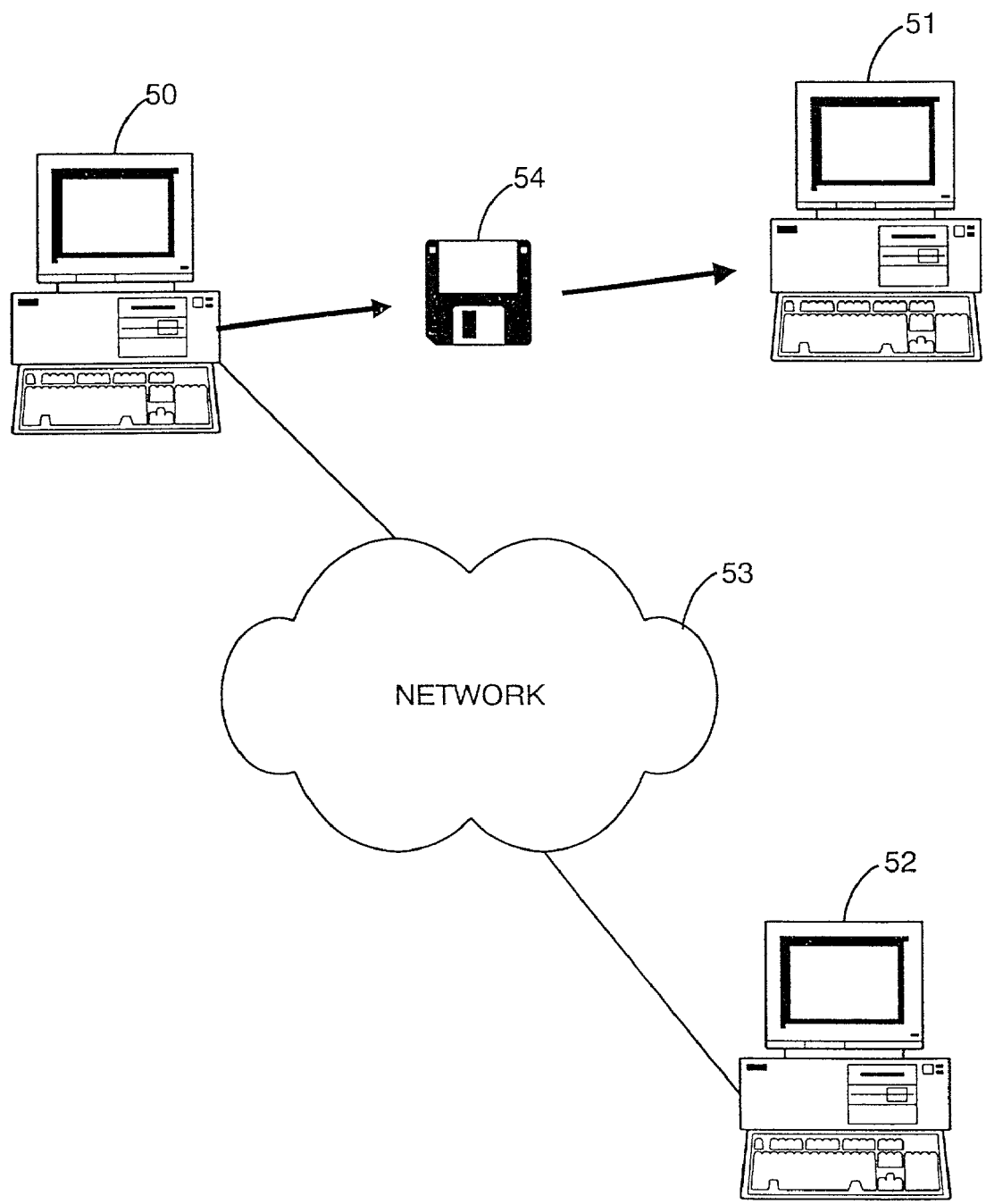
FIG. 12 is a diagram of use of the cipher system in the transmission of encrypted data.

FIG. 12 illustrates an application of the cipher system for the communication of enciphered data between computers 50, 51 and 52.

Computer 50 implements the encipher apparatus and generates enciphered data. This can either be stored on a non-volatile memory device such as a floppy disc 54 and passed to another computer 51 for deciphering, or it can be broadcast or transmitted over a network 53 for reception by computer 52 for deciphering there. Before the exchange of enciphered data however, it is necessary for the operators of computers 50 and 51 or 50 and 52 to secretly exchange the cipher design description. This can be done by any conventional secret means such as a secure telephone call, a secure facsimile transmission or by letter, by courier or even by a secure e-mail.

Figure 13:
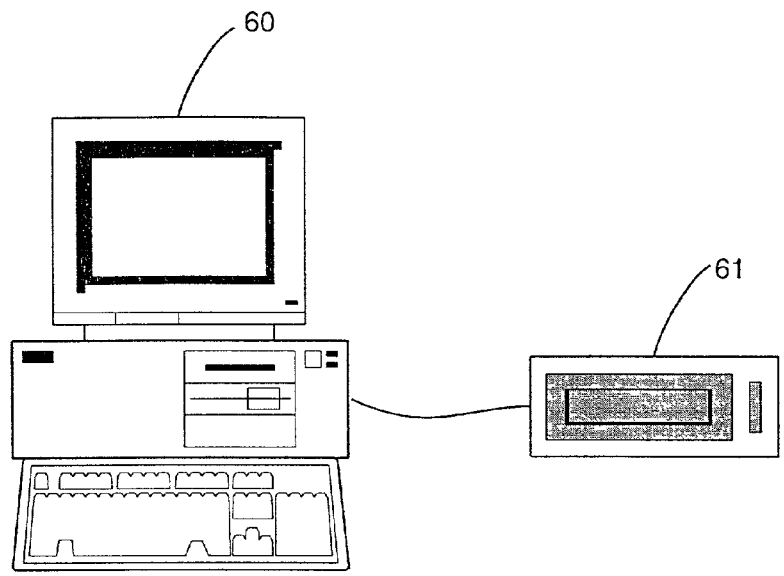
FIG. 13 is a diagram of a specific embodiment wherein the cipher design description and possibly the encipher/decipher apparatus is exchanged using a smartcard.

FIG. 13 illustrates another embodiment of the present invention wherein a computer 60 is provided with a smartcard programmer/reader 61. In this embodiment it is possible for a smartcard to be loaded with the decipher program, i.e. software defining a software implementation of a reversible circuit for use in a cipher unit, as well as the cipher design description. The smartcard can then be given to the intended recipient of enciphered data. Thus the intended recipient of the enciphered data can simply insert the smartcard into a smartcard reader and the processor on the smartcard will implement the decipher apparatus and thus inherently the encipher apparatus. Thus the smartcard can be used for both transmitting and receiving enciphered data. This embodiment can be used by an institution such as a financial institution (Alice). A user (Bob) will be issued with a smartcard and will be able to communicate securely with the institution by inserting the smartcard into the reader 61 e.g. an automatic teller machine (ATM).

Figure 14:
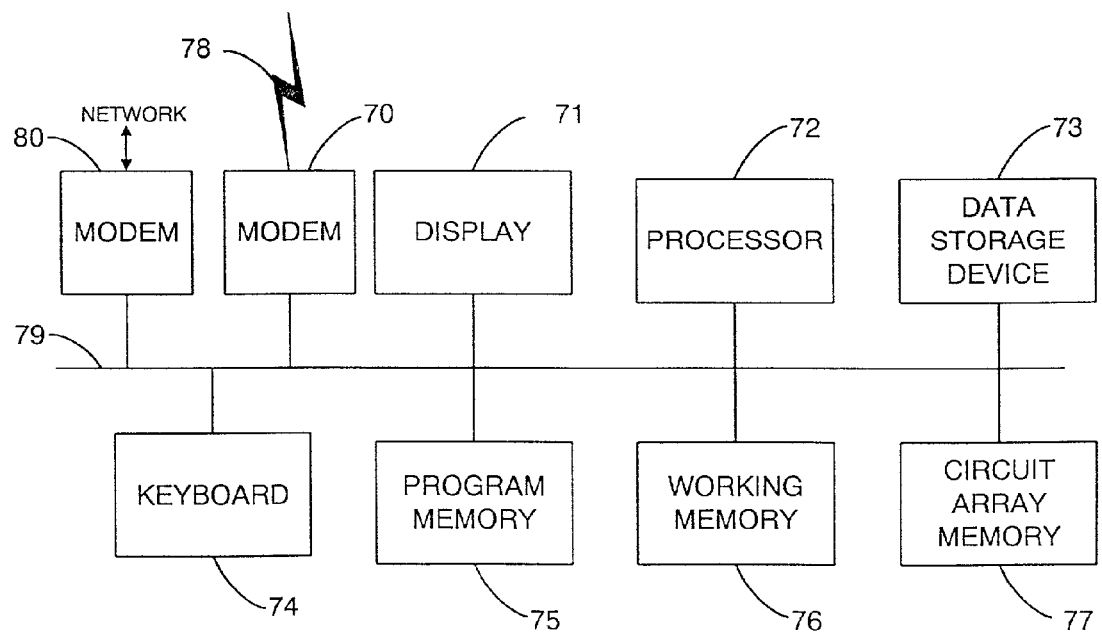
FIG. 14 is a diagram of a processing apparatus capable of implementing the cipher apparatus.

FIG. 14 is a schematic diagram of the implementation of the cipher apparatus in a general purpose computer. The computer is provided with a bus 79 to communicate between operational units. A modem 70 is provided for connection over a telecommunications line 78 to transmit and receive enciphered data. Also a network card 80 is provided for connection over a network to transmit and receive data. A keyboard 74 is provided for inputting data and a display 71 is provided for displaying deciphered data. A processor 72 implements the cipher apparatus either in a forward direction for enciphering or in a reverse direction for deciphering in accordance with the circuit array stored in the memory section 77. The processor 72 operates in accordance with the circuit emulation program stored in the program memory 75. During the operation of the processor 72 data is temporarily stored in the working memory 76 and at the end of the enciphering or deciphering process the enciphered or deciphered data can be stored in the data storage device 73 which can comprise non-volatile storage media such as a floppy disc, a hard disc, a writable CD-ROM, or EPROM.

The method of operation of the cipher apparatus of this embodiment of the present invention will now be described with reference to FIGS. 15 to 18.

Figure 15:
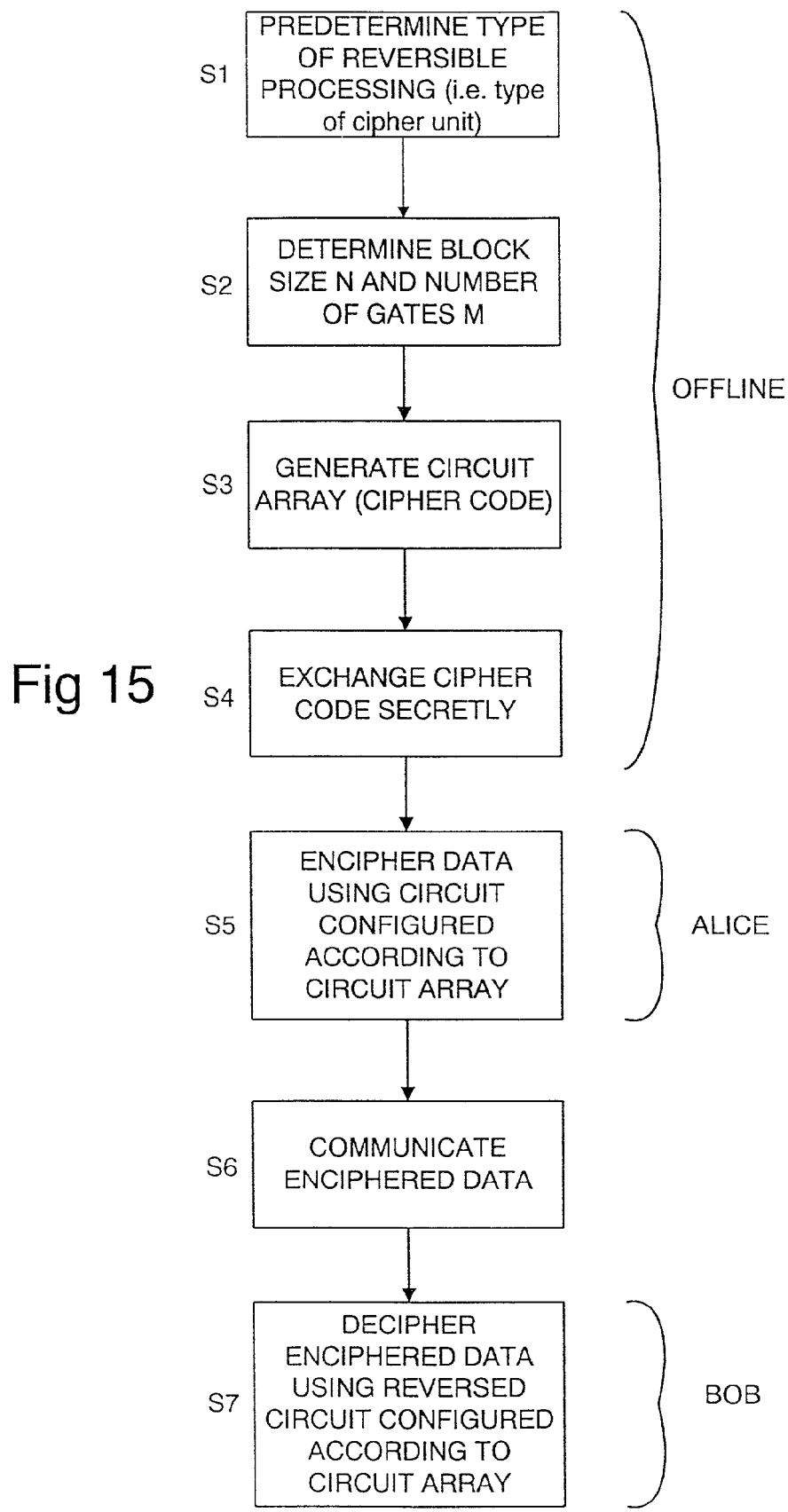
FIG. 15 is a flow diagram showing the generation and exchange of encrypted data using the cipher system.

FIG. 15 illustrates the steps involved in the generation of the cipher design description, enciphering of data, the transmission of the enciphered data and the deciphering of the enciphered data.

In step S1 a type of reversible processing is predetermined or selected e.g. Fredkin's gates. In step S2 the number of gates M and the block size N of the data is selected. In step S3 the cipher design description (or circuit array) is then generated. In step S4 the cipher design description is exchanged secretly between Alice and Bob. In step S5 Alice enciphers data using an cipher apparatus configured according to the circuit array, i.e. as an encipher apparatus. Alice then communicates the enciphered data to Bob in step 36. In step S7 Bob deciphers the enciphered data using a reverse cipher apparatus, i.e. a decipher apparatus, configured appropriately according to the circuit array (cipher design description).

Figure 16A:
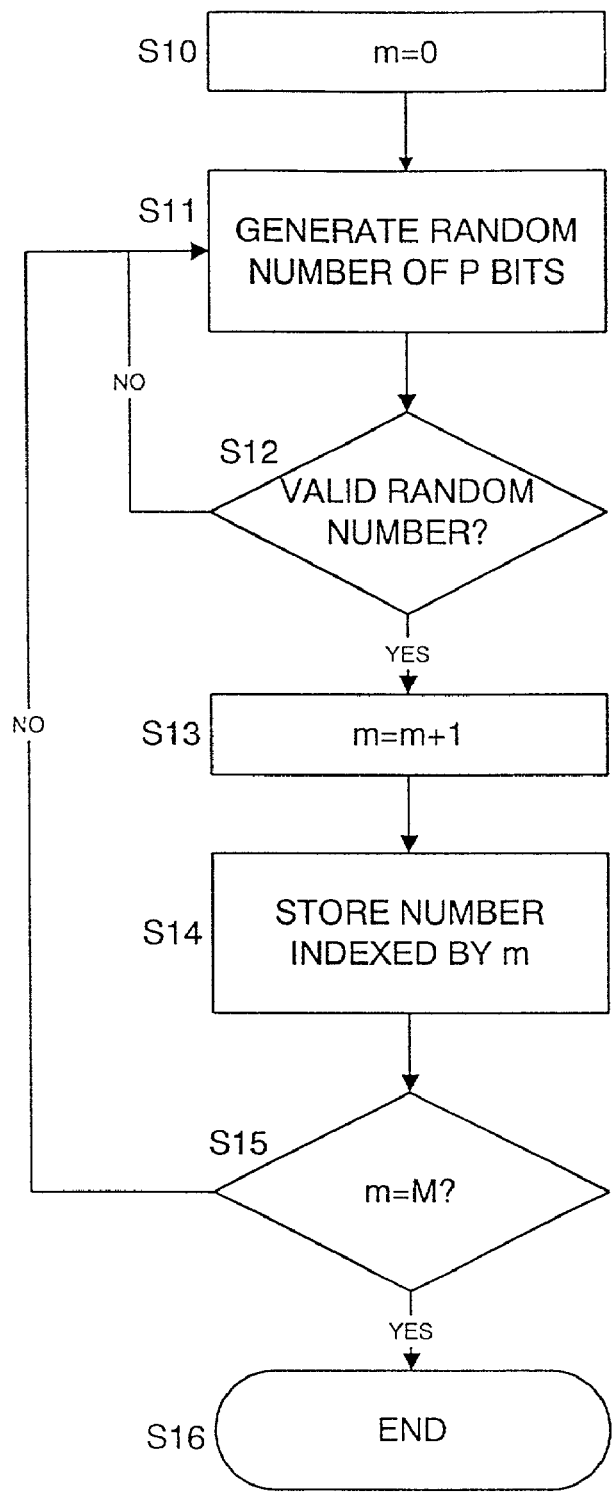
FIG. 16a is a flow diagram illustrating the generation of the cipher design description.

FIG. 16*a* illustrates in more detail the steps involved in a generation of the cipher design description.

In step S10 a variable m is set to 0. This variable acts as the cipher unit (gate) number. In step S11 a random number having P bits is then generated, where P is the number of bits necessary to describe a cipher unit. In the example given hereinabove using Fredkin's gates, P=12 (4 segments each of 3 bits). In step S12 a check is carried out to determine whether this is a valid random number. One of the tests is whether the random number defines the cipher unit having two or more pins on the same input data address which is not allowed. In step S13 if the random number is valid the cipher unit number m is incremented and in step S14 the generated random number is stored indexed by m. In step S15 it is then determined whether random numbers have been generated for all of the cipher units i.e. m=M. If not, the process returns to step S11 for the generation of further random numbers. If random numbers have been generated defining all of the cipher units then the process ends in step S16.

Figure 16B:
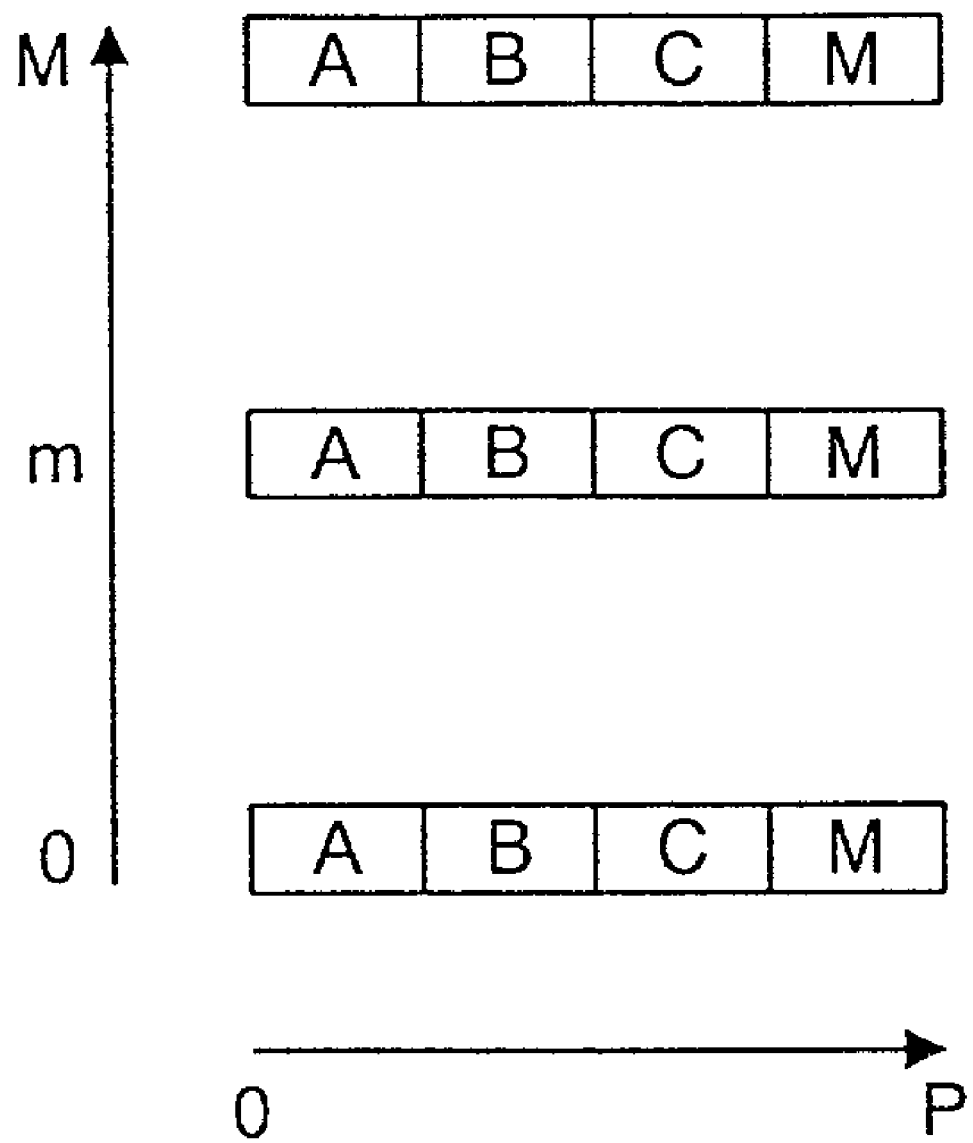
FIG. 16b is a schematic diagram of the cipher design description.

FIG. 16*b* illustrates the circuit array which comprises a P×M matrix. The matrix is indexed by M where each entry comprises P bits divided into four segments A, B, C and M each of 3 bits.

Figure 17:
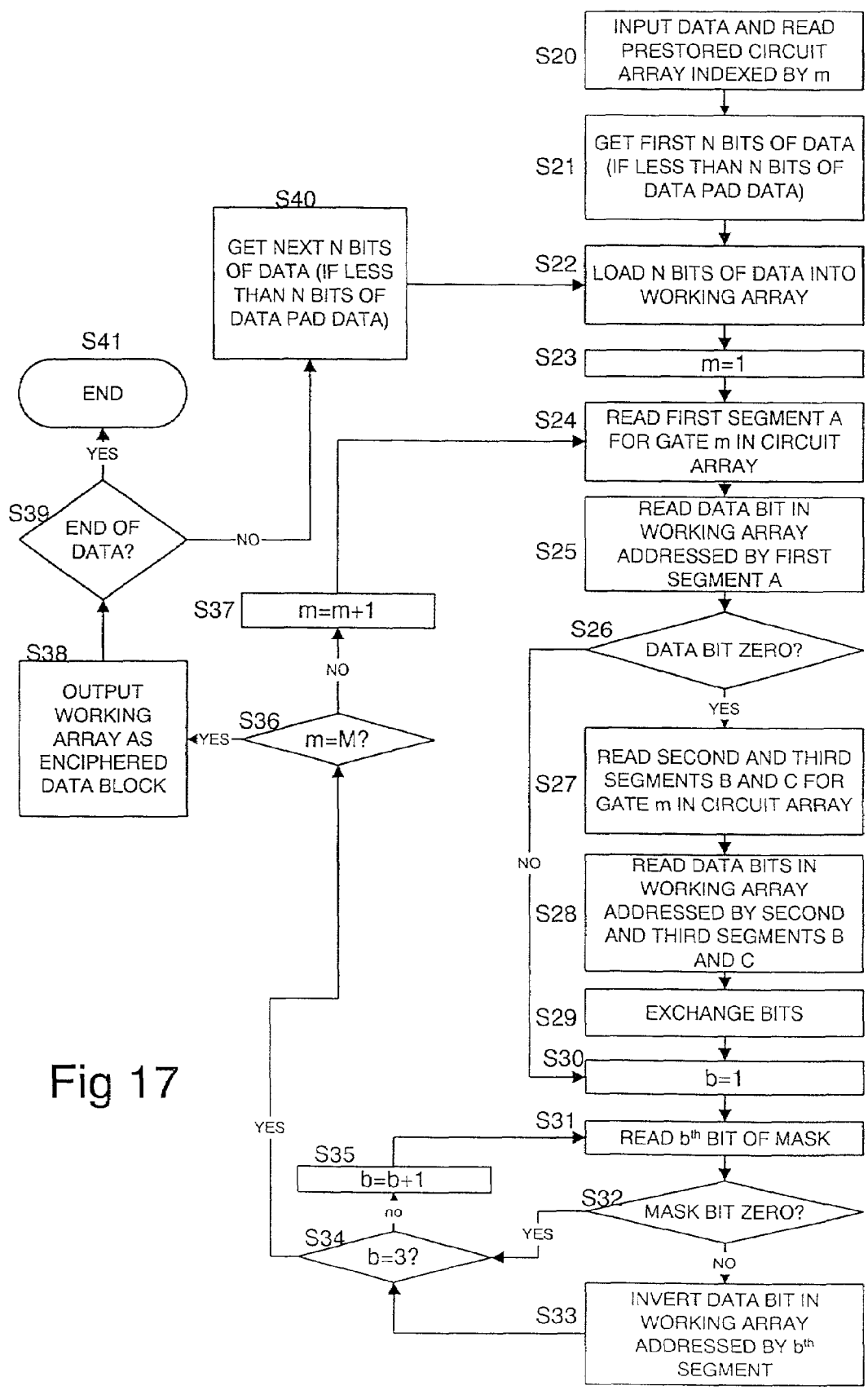
FIG. 17 is a flow diagram illustrating the encipher process.

The process of enciphering data will now be described with reference to FIG. 17.

In step S20 the data to be enciphered is input and the prestored circuit array (secret cipher design description) indexed by m is read. The first N bits of data are then read as a data block. If there are less than N bits of data, padding data is generated in order to make up N bits. The N bits of data are then loaded into the working array in step S22 and in step S23 the cipher unit counter m is set to 1. In step S24 the first segment A for cipher unit m in the circuit array is read and this is used to address a data bit from the working array in step S25. In step 326 it is then determined whether the read data bit is 0. If it is not 0 then there is no exchange of data between input B and C and the process proceeds to step S30. If it is 0 then data bits B and C are exchanged. Thus in step S27 the second and third segments B and C for the cipher unit m in the circuit array are then read and these are used to address two data bits in the working array. In step S29 these data bits are then exchanged and the process proceeds to step S30 where a mask bit counter b is set to 1 to index the first mask bit for segment A.

In step 331 the $b^{th}$ bit of the mask is read and in step S32 it is determined whether this is zero. If it is not zero the data bit in the working array addressed by the $b^{th}$ segment is inverted in step S33 otherwise no action is taken. In the next step S34 is determined whether all of the mask bits have been read i.e. b=3 indicating that the mask bit for segment C has been read. If not the mask bit counter b is incremented in step S35 to index the next mask bit for segment B or C and the process returns to step S31. If all of the mask bits have been read it is then determined whether all of the cipher units have been implemented i.e. m=M in step S36. If not, the cipher unit counter m is incremented and the process returns to step S24. Otherwise in step S38 the working array is output as a block of enciphered data. In step S39 it is then determined whether the data has all been enciphered and if not, in step S40 the next N bits of data are input and padded if necessary and the process returns to step S22. Otherwise the process ends in step S41 since all of the data has been enciphered.

Figure 18:
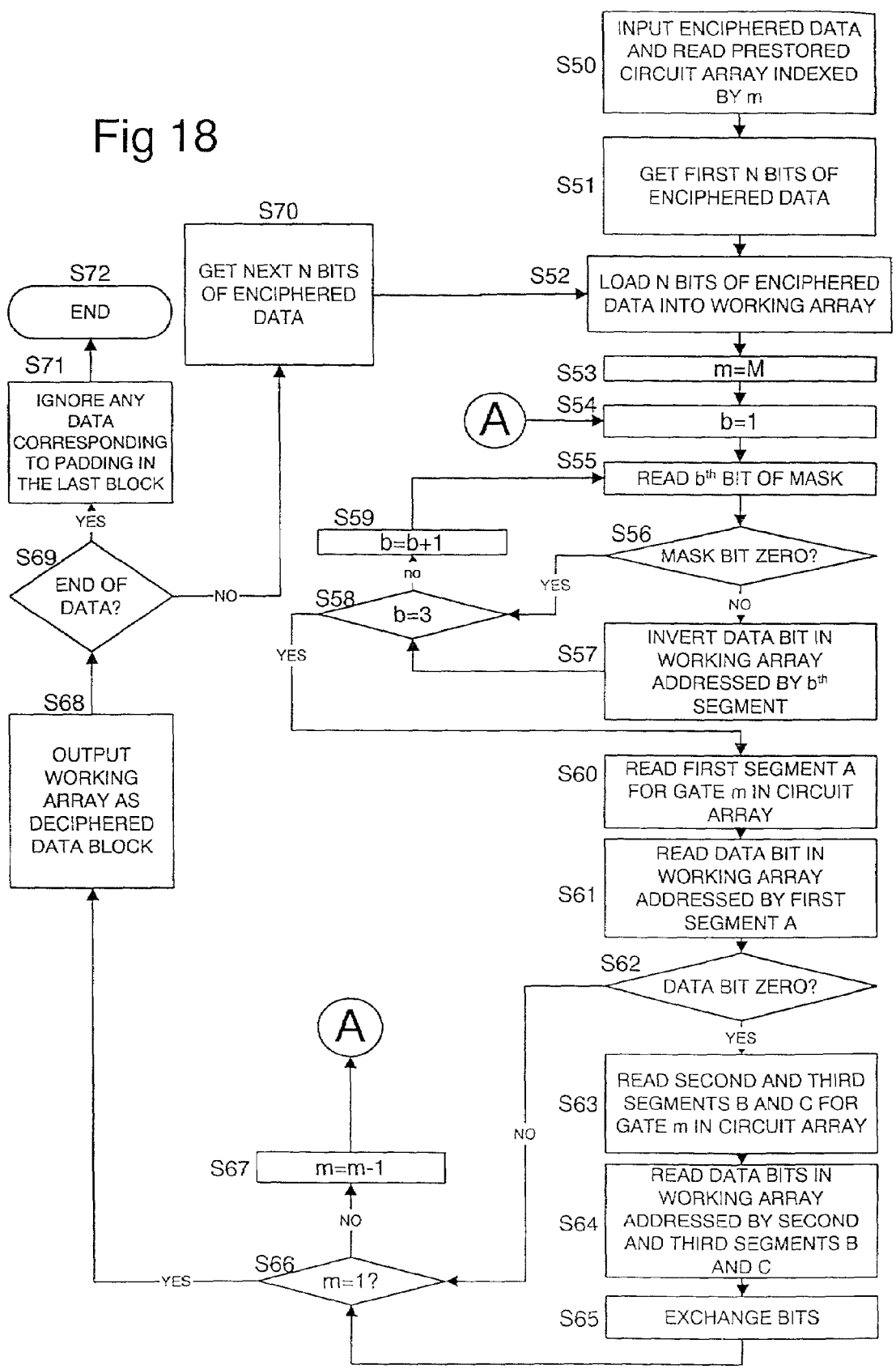
FIG. 18 is a flow diagram illustrating the decipher process.

The process of deciphering enciphered data will now be described with reference to FIG. 18.

In step S50 the enciphered data is input and the prestored circuit array indexed by m is read. The first N bits of enciphered data are then read in step S51. The N bits of enciphered data are then loaded into the working array in step S52 and in step S53 the cipher unit counter m is set equal to M i.e. the first cipher unit to be implemented is in fact the last cipher unit in the array so that the cipher unit are implemented sequentially in reverse. In step S54 the mask bit counter b is then set to the first mask bit for segment A and in step S55 the $b^{th}$ bit of the mask is read. It is then checked in step S56 whether this is zero and if not the data bit in the working array addressed by the $b^{th}$ segment is inverted in step S57 otherwise no action is taken. The process then proceeds to step S58 wherein it is determined whether all of the mask bits have been read i.e. b=3. If not, in step S59 the mask bit counter b is incremented to index the next mask bit for segment B or C and the process returns to step S55. If all of the mask bits have been read for the mask segment, in step S60 the first segment A for cipher unit m in the circuit array is read. A data bit in the working array addressed by this first segment A is then read in step S61 and it is determined whether this is zero in step S62. If it is zero the second and third segments B and C for cipher unit m in the circuit array are read in step S63 and in step S64 the data bits in the working array addressed by the second and third segments B and C are read. These are then exchanged in step S65 and the process proceeds to step S66. If in step S62 the data bit addressed by the first segment A is not zero the process proceeds to step S66. In step S66 it is determined whether the process has just been carried out for the first cipher unit i.e. m=1 indicating that the deciphering of the current block has finished. If not in step S67 the cipher unit counter is decremented and the process returns to step S54, and if so in step S68 the working array is output as a deciphered data block. In step S69 it is determined whether all of the blocks have been deciphered and if not in step S70 the next N bits of deciphered data are read. The process then returns to step S52. If in step S69 it is determined that all of the data has been deciphered, in step S71 any data corresponding to padding data in the last block is ignored and the process ends in step S72.

In the above enciphering and deciphering embodiment each cipher unit is implemented in software sequentially.

Figure 19:
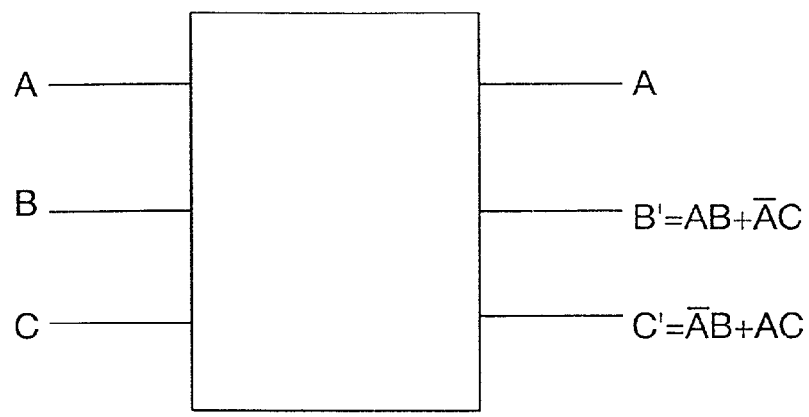
FIG. 19 is a Fredkin's gate illustrated as a three-input logic gate.
Figure 20:
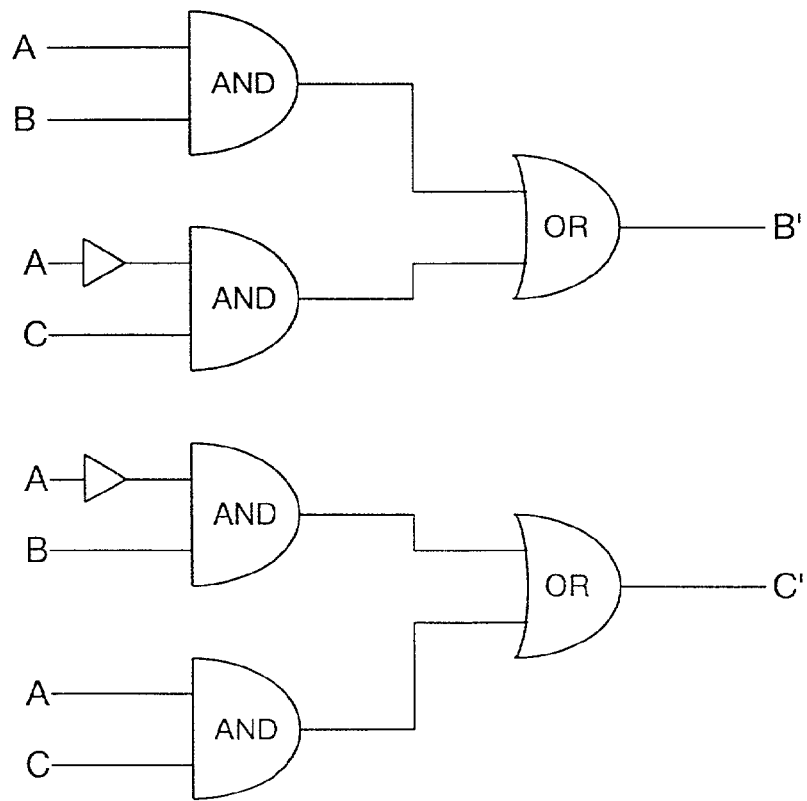
FIG. 20 is an implementation of the logic gate of FIG. 19 using AND, OR and NOT gates.

In the embodiment described hereinabove the reversible circuit (cipher unit) is implemented by a Fredkin's gate. The Fredkin's gate can be viewed as a three-input, three-output logic gate as illustrated in FIG. 19. This can be implemented using AND, OR and NOT logic gates (which are not reversible) as illustrated in FIG. 20. Of course, since the logic gates can only conduct signals one-way in order for the circuit to be reversible, it must perform an operation which is symmetric i.e. if the output of the circuit is put back as an input, the original input will be obtained. This is because a Fredkin's gate is an inverse of itself.

Thus the circuit illustrated in FIG. 20 can form the basis of a cipher unit 40 of an encipher apparatus or a decipher apparatus (FIGS. 3 and 4).

Figure 21:
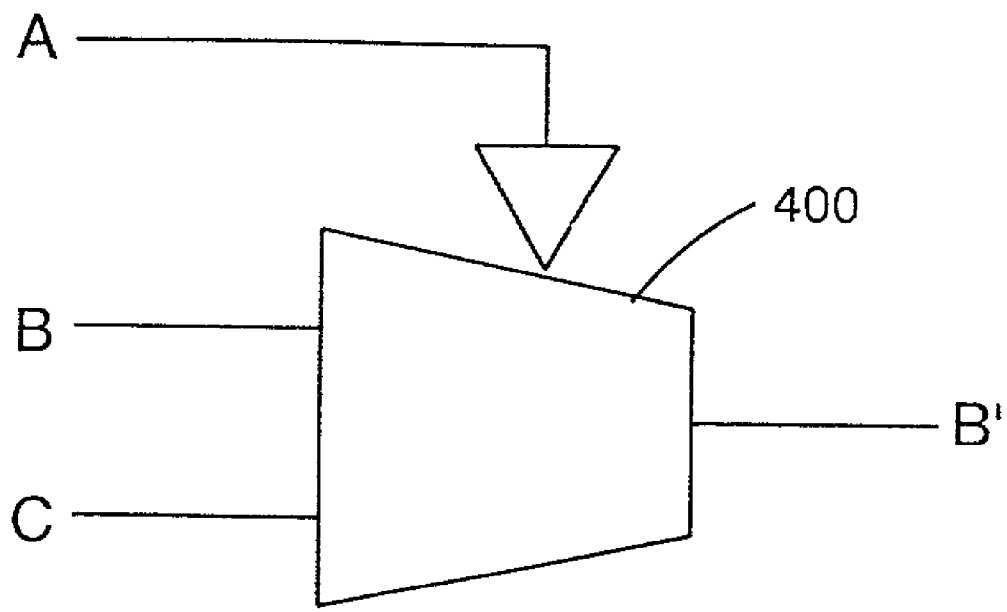
FIG. 21 is a diagram of an implementation of the Fredkin's gate using multiplexers.
Figure 21:
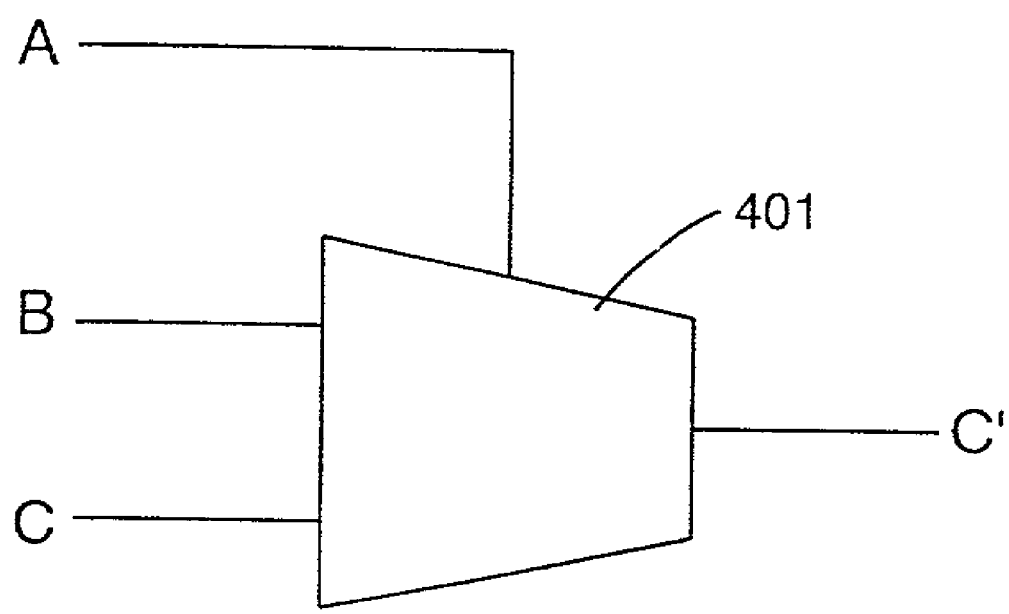

Another implementation of the Fredkin's gate can be chosen using multiplexers as illustrated in FIG. 21. Each multiplexer 400 and 401 receives two input signals and one control signal. If the control signal is zero then the first input signal is passed. If the control signal is one the second input signal is passed.

Figure 22:
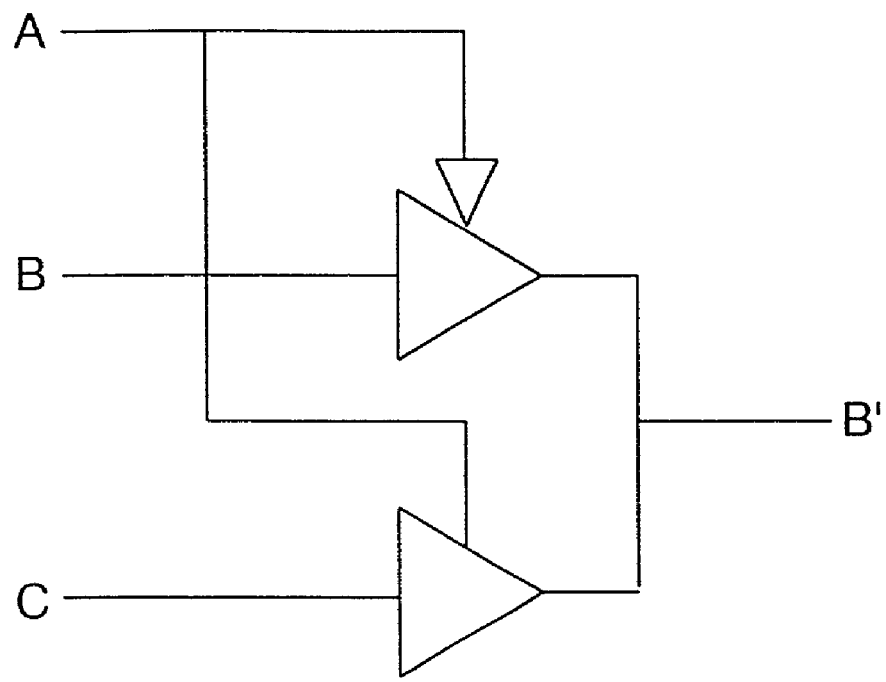
FIG. 22 is a diagram of an implementation of the Fredkin's gate using three-state buses.
Figure 22:
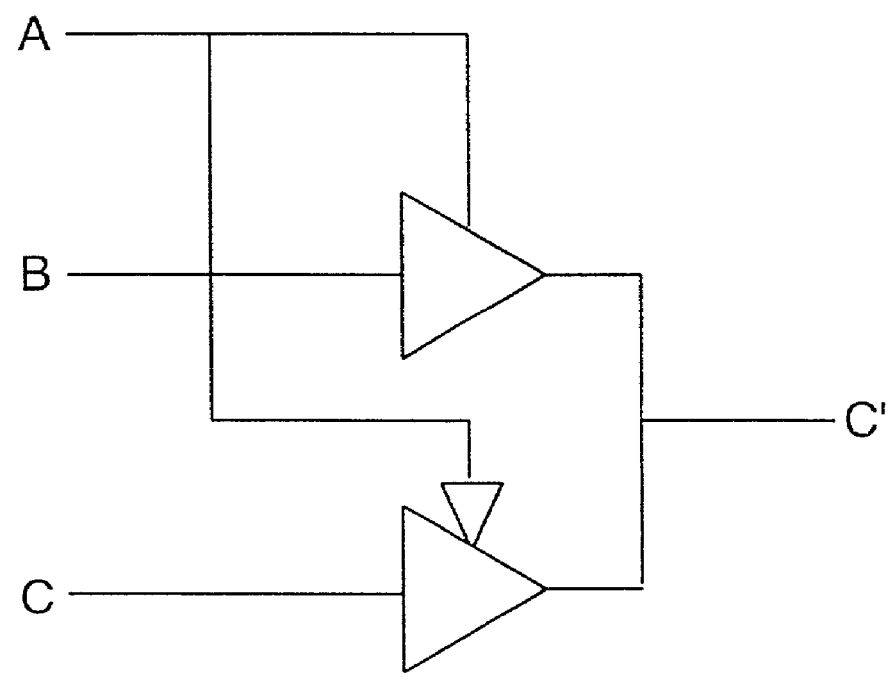

The Fredkin's gate can also be implemented by three-state buses as illustrated in FIG. 22.

All of the three circuits given hereinabove can be implemented either in software using a computer program which generates the circuits and simulates them or using electronic hardwired circuits. It is thus possible for Alice and Bob to be supplied with off the shelf programmable logic gate array (PLGA) chips and with a storage medium storing logic to configure the PLGA to carry out the encipher method or the decipher method of the present invention, i.e. the software that downloads the circuit description onto the chip. Such software languages for circuit descriptions can for example comprise Verilog-HDL. In order for Alice and Bob to establish the secret communications, the downloading of the cipher circuit description will only be done once. When the circuit is implemented using hardwired circuits, Alice and Bob can use one circuit for encryption and one circuit for decryption. It is however possible to use only one circuit by downloading the circuit description at the time when communications take place. For example, if Alice wishes to send an encrypted message she downloads the cipher design description (circuit array) onto the chip. If she receives a message she can download the corresponding decryption circuit (its circuit description) onto the chip.

In the embodiment given above, the Fredkin's gate is implemented in logic. However, a Fredkin's gate can be implemented in many different ways, for example, it is possible to implement the Fredkin's gate in optics. The device which can be used to implement the Fredkin's gate in optics is the Mach/Zehnder interferometer switch. Such a switch is disclosed in a paper by J. Dommelly et al entitled "A Gallium Arsenide Electro-optical Interferometer Modulator", (Proc. 7th Topical Meeting on Integrated and Guided Wave Optics, Kissimmee 1984).

Although in the above embodiments, the use of Fredkin's gate has been described, the cipher units of the present invention can be implemented in many different ways. For example, another form of reversible universal logic is the AND/NAND gate (which is also known as Toffoli's gate). The operation of the AND/NAND gate can be given by:

$$\begin{pmatrix} x_1 \\ x_2 \\ \ldots \\ x_{n1} \\ x_n \end{pmatrix} \rightarrow \begin{pmatrix} x_1 \\ x_2 \\ \ldots \\ x_{n1} \\ x_n \oplus x_1 x_2 K x_{n1} \end{pmatrix}$$

Figure 23:
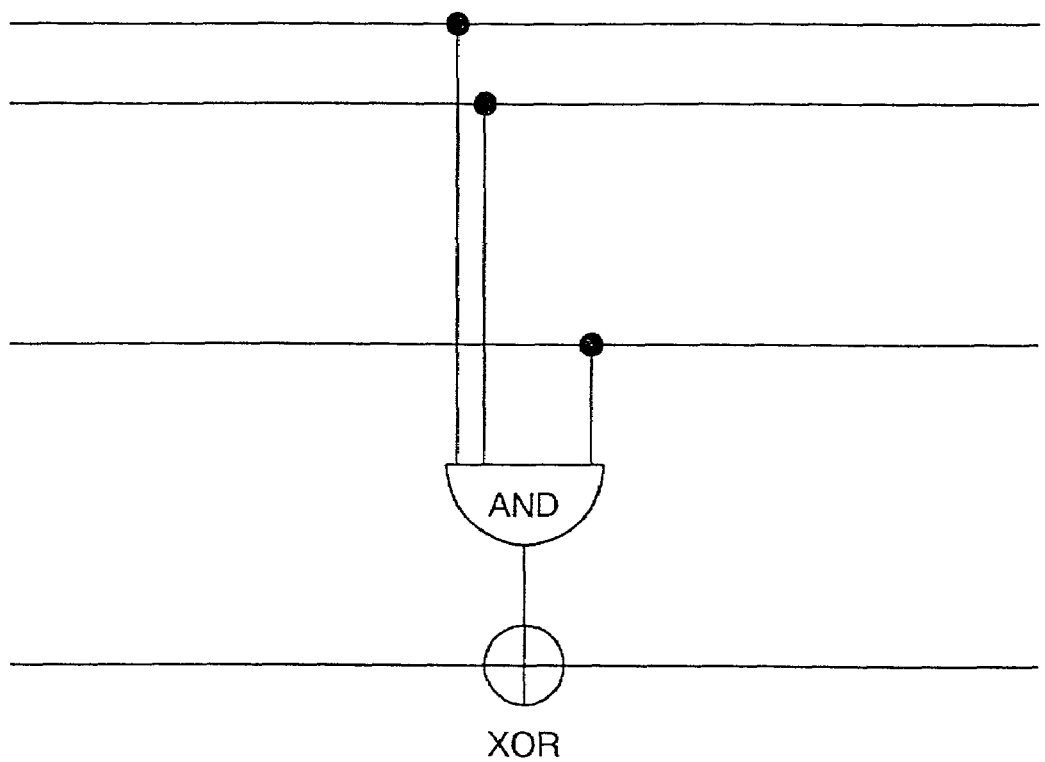
FIG. 23 is a diagram of an AND/NAND gate as an alternative reversible gate to the Fredkin's gate.

The AND/NAND gate is illustrated in FIG. 23. In this gate the input on (n-1) of the n inputs act to switch the $n^{th}$ input by virtue of an AND gate receiving the (n-1) inputs and acting on an XOR gate on the $n^{th}$ input. Details on this particular type of gate are given in the paper by T. Toffoli entitled "Bicontinuous Extensions of Invertible Combinatorial Functions" (Mathematical Systems Theory, Vol. 14, pp. 13–23).

The AND/NAND gate can be implemented not just in logic as illustrated in FIG. 23, but by any physical system.

In a system for implementing the cipher units of the present invention, any reversible computational system can be used and the present invention is not limited to the use of circuit implementation. For example, reversible cellular automata can be used as described in "Computation and Construction Universality of Reversible Cellular Automata" by T. Toffoli (J. Comput. Sys. Sci., Vol. 15, 1977, pp. 213–231), a reversible Turing machine as described in "Logical Reversibility of Computation" by C. Bennett (IBM J. Res. Dev. 6, 1973 pp. 525–532), quantum computing, for a "billiard ball", model of computation as described in "Conservative Logic" by E. Fredkin and T. Toffoli (International Journal of Theoretical Physics, Vol 21. nos. 3/4, 1982), for example.

In the embodiments described hereinabove, for security, a random number generator is used in order to randomly generate a circuit configuration. The random number generator is not essential to the present invention but does increase the level of security. Any of the standard strong real number generators available for crypto-software libraries can be used, or a true physical random source can be used. The generation of random or pseudo-random numbers is well known in the art.

It will be apparent to the skilled person in the art that the present invention can be implemented by providing Alice and Bob with a program that randomly generates circuits and simulates them. Generally in the software implementation the circuits will only be generated and simulated using the cipher design description (circuit array) when the signal is input to be enciphered or deciphered.

If the cipher apparatus is to be implemented using programmable hardware, a manufacturer will provide Alice and Bob with a conventional programmable logic gate array and a storage medium storing logic to set it up to run as a cipher apparatus.

What is claimed is:

1. Encipher apparatus for enciphering a signal, comprising:
    forming means for receiving the signal to be enciphered and for outputting the signal as a sequence of data blocks, each having a first predetermined number of bits;
    a plurality of encipher functional modules sequentially coupled to operate sequentially on the sequence of data blocks from the forming means; and
    configuring means,
    wherein each encipher functional module comprises
        a module input,
        a module output, and
        a respective data processing unit having a parallel input and a corresponding parallel output and being arranged to perform a respective reversible process upon a set of bits at its parallel input and to produce at its corresponding parallel output a corresponding enciphered set of bits;
    and each encipher functional module is operable under the control of the configuring means to couple a respective predetermined set of the bits of a data block received at its module input to the parallel input of its data processing unit and to provide at its module output an enciphered data block in which said respective predetermined set of bits is replaced by the corresponding enciphered set of bits produced at the parallel output of its data processing unit.

2. Encipher apparatus according to claim 1, wherein said respective data processing units are of a single type.

3. Encipher apparatus according to claim 1, wherein the reversible process of at least one of said data processing units is a switching operation controlled by at least one of the set of bits received at its parallel input.

4. Encipher apparatus according to claim 1 wherein each of said data processing units is a reversible gate.

5. Encipher apparatus according to claim 3, wherein said reversible gate comprises a Fredkin's gate or an AND/NAND gate.

6. Encipher apparatus according to claim 1 wherein said configuring means is operative to control said encipher functional modules in accordance with a cipher design description.

7. Encipher apparatus according to claim 6, including means for receiving said cipher design description.

8. Encipher apparatus according to claim 6, including means for generating said cipher design description.

9. Encipher apparatus according to claim 8, wherein the generating means includes a random or pseudo-random number generator and is operative to use random or pseudo-random numbers generated by said random or pseudo-random number generator to describe in code said respective predetermined sets of bits.

10. Encipher apparatus according to claim 1, wherein each of said plurality of encipher functional modules comprises a logic gate which does not conserve logic.

11. Encipher apparatus according to claim 1, wherein said plurality of encipher functional modules form a programmable circuit.

12. Encipher apparatus according to claim 11, wherein said plurality of encipher functional modules comprises a programmable logic gate array, and said configuring means comprises a programming means for programming said programmable logic gate array.

13. Encipher apparatus according to claim 11, wherein each of said plurality of encipher functional modules comprises analogue electronic modules.

14. Encipher apparatus according to claim 1, wherein the signal is an optical signal and each of said plurality of encipher functional modules comprises optical components.

15. Encipher apparatus according to claim 1, comprising a programmable computing apparatus, wherein each of said plurality of encipher functional modules comprises a computer code routine implemented on said programmable computing apparatus.

16. Encipher apparatus according to claim 15, wherein said computer code routine is in the form of a generic module code routine repeatedly implemented dependent upon information from said configuring means.

17. Encipher apparatus according to claim 1 including first selection means for selecting a type of encipher functional module to be used from amongst a plurality of possible types of encipher functional modules, wherein said configuring means is adapted to configure the encipher apparatus to use the selected type of encipher functional module.

18. Encipher apparatus according to claim 1, including second selection means for selecting the number of said plurality of encipher functional modules to be used, wherein said configuring means is adapted to configure the encipher apparatus to use the selected number of encipher functional modules.

19. Encipher apparatus according to claim 1, including third selection means for selecting for each of said plurality of encipher functional modules the respective predetermined set of the bits of a data block received at its module input.

20. Cipher apparatus comprising the encipher apparatus of claim 1 and a decipher apparatus for deciphering a signal comprising:
    forming means for receiving the signal to be deciphered and for outputting the signal as a sequence of data blocks, each having a first predetermined number of bits;
    a plurality of decipher functional modules sequentially coupled to operate sequentially on the sequence of data blocks from the forming means; and
    configuring means,
    wherein each decipher functional module comprises
        a module input,
        a module output, and
        a respective data processing unit having a parallel input and a corresponding parallel output and being arranged to perform a respective reversible process upon a set of bits at its parallel input and to produce at its corresponding parallel output a corresponding enciphered set of bits, and is operable under the control of the configuring means of the decipher apparatus to couple a respective predetermined set of the bits of a data block received at its module input to the parallel input of its data processing unit and to provide at its module output a deciphered data block in which said respective predetermined set of bits is replaced by the corresponding deciphered set of bits produced at the parallel output of its data processing unit;
    wherein the plurality of encipher functional modules of the encipher apparatus is constituted by the plurality of decipher functional modules of the decipher apparatus but are sequentially coupled in the opposite order.

21. A method of enciphering a signal, the method comprising:
receiving the signal to be enciphered and forming the signal into a sequence of data blocks, each having a first predetermined number of bits;
applying the sequence of data blocks to a plurality of encipher functional modules sequentially coupled to operate sequentially on the sequence of data blocks, each encipher functional module comprising
a module input,
a module output, and
a respective data processing unit having a parallel input and a corresponding parallel output and being arranged to perform a respective reversible process upon a set of bits at its parallel input and to produce at its corresponding parallel output a corresponding enciphered set of bits; and
configuring each encipher functional module to couple a respective predetermined set of the bits of a data block received at its module input to the parallel input of its data processing unit and to provide at its module output an enciphered data block in which said respective predetermined set of bits is replaced by the corresponding enciphered set of bits produced at the parallel output of its data processing unit.

22. A method according to claim 21, wherein the encipher functional modules are of a single type.

23. A method according to claim 21, wherein the reversible process of at least one of said data processing units is a switching operation controlled by at least one of the bits of a data block received at its parallel input.

24. A method according to claim 21, wherein each of said plurality of encipher functional modules acts as a reversible gate.

25. A method according to claim 21, wherein the configuring of each of said encipher functional modules is in accordance with a cipher design description.

26. A method according to claim 25, including receiving said cipher design description.

27. A method according to claim 25, including generating said cipher design description.

28. A method according to claim 25, including generating random or pseudo-random numbers and using the generated random or pseudo-random numbers to generate said cipher design description.

29. A method according to claim 28, wherein a respective generated random or pseudo-random number is used to describe in code the respective predetermined set of bits for a respective encipher functional module.

30. A method according to claim 29, wherein the logic operations do not conserve logic.

31. A method according to claim 21, wherein each of said plurality of encipher functional modules comprises a programmable logic gate array and the configuring step includes programming said programmable logic gate array.

32. A method according to claim 21, implemented by computer code on a computing apparatus, wherein each of said plurality of encipher functional modules comprises a computer code routine implemented in dependence upon configuration information.

33. A method according to claim 32, wherein the computer code routine is implemented repeatedly dependent upon the number of encipher functional modules to be implemented.

34. A method according to claim 21, including selecting the type of encipher functional module to be used from amongst a plurality of possible types of encipher functional modules.

35. A method according to claim 21, including selecting the number of said plurality of encipher functional modules used.

36. A method according to claim 21, including selecting the respective predetermined set of the bits of a received data block for each of said plurality of encipher functional modules.

37. A cipher method for enciphering and deciphering a signal comprising the encipher method of claim 21 and a decipher method comprising:
receiving the signal to be deciphered and outputting the signal as a sequence of data blocks, each having a first predetermined number of bits;
applying the sequence of data blocks to a plurality of decipher functional modules sequentially coupled to operate sequentially on the sequence of data blocks, each of said plurality of said functional modules comprising:
a module input,
a module output, and
a respective data processing unit having a parallel input and a corresponding parallel output and being arranged to perform a respective reversible process upon a set of bits at its parallel input and to produce at its corresponding parallel output a corresponding enciphered set of bits; and
configuring each of said plurality of decipher functional modules to couple a respective predetermined set of the bits of a data block received at its module input to the parallel input of its data processing unit and to provide at its module output a deciphered data block in which said respective predetermined set of bits is replaced by the corresponding deciphered set of bits produced at the parallel output of its data processing unit.

38. Processor implemented instructions stored on a computer readable storage medium, the processor implemented instructions causing a processor to carry out the method of claim 21.

39. A carrier medium carrying the processor implemented instructions according to claim 38.

40. A storage medium storing logic to configure a programmable logic gate array to carry out the method of claim 21.

41. Decipher apparatus for deciphering a signal, comprising:
forming means for receiving the signal to be deciphered and for outputting the signal as a sequence of data blocks, each having a first predetermined number of bits;
a plurality of decipher functional modules sequentially coupled to operate sequentially on the sequence of data blocks from the forming means; and
configuring means,
wherein each decipher functional module comprises
a module input,
a module output, and
a respective data processing unit having a parallel input and a corresponding parallel output and being arranged to perform a respective reversible process upon a set of bits at its parallel input and to produce at its corresponding parallel output a corresponding enciphered set of bits;

and each decipher functional module is operable under the control of the configuring means to couple a respective predetermined set of the bits of a data block received at its module input to the parallel input of its data processing unit and to provide at its module output a deciphered data block in which said respective predetermined set of bits is replaced by the corresponding deciphered set of bits produced at the parallel output of its data processing unit.

42. Decipher apparatus according to claim 41, wherein said decipher functional modules are of a single type.

43. Decipher apparatus according to claim 41, wherein said configuring means is operative to control each of said plurality of decipher functional modules in accordance with a cipher design description.

44. Decipher apparatus according to claim 43, wherein cipher design description is equivalent to the inverse of a cipher design description used to control encipher functional modules of an encipher apparatus used to produce the enciphered signal.

45. Decipher apparatus according to claim 43, including means for receiving said cipher design description.

46. Decipher apparatus according to claim 43, including means for generating said cipher design description.

47. Decipher apparatus according to claim 46, wherein the generating means includes a random or pseudo-random number generator and is operative to use random or pseudo-random numbers generated by said random or pseudo-random number generator to describe in code said respective predetermined sets of bits.

48. Decipher apparatus according to claim 41, wherein the reversible process of at least one of said data processing units is a switching operation controlled by at least one of the bits of a data block received at its parallel input.

49. Decipher apparatus according to claim 41, wherein each of said data processing units comprises a reversible gate.

50. Decipher apparatus according to claim 49, wherein said reversible gate comprises a Fredkin's gate or an AND/NAND gate.

51. Decipher apparatus according to claim 41, wherein each of said plurality of decipher functional modules comprises a logic gate which does not conserve logic.

52. Decipher apparatus according to claim 41, wherein each of said plurality of decipher functional modules forms a programmable circuit.

53. Decipher apparatus according to claim 52, wherein said plurality of decipher functional modules comprise a programmable logic gate array, and said configuring means comprises a programming means for programming said programmable logic gate array.

54. Decipher apparatus according to claim 41, wherein the signal is an optical signal and each of said plurality of decipher functional modules comprises optical components.

55. Decipher apparatus according to claim 41, comprising a programmable computing apparatus, wherein each of said plurality of decipher functional modules comprises a computer code routine implemented on said programmable computing apparatus.

56. Decipher apparatus according to claim 55, wherein each of said plurality of decipher functional modules comprises a computer code routine repeatedly implemented upon information from said configuring means.

57. Decipher apparatus according to claim 41, wherein said configuring means is responsive to type identifying information included in a cipher design description to configure the type of each of said plurality of decipher functional modules in accordance with said type identifying information.

58. Decipher apparatus according to claim 41, wherein said configuring means is responsive to module number information included in a cipher design description to configure a corresponding number of said plurality of decipher functional modules.

59. Decipher apparatus according to claim 41, wherein said configuring means is responsive to data block size information included in a cipher design description adapted to configure the input and output of each of said plurality of decipher functional modules.

60. A method of deciphering an enciphered signal, the method comprising:
  receiving the signal to be deciphered and outputting the signal as a sequence of data blocks, each having a first predetermined number of bits;
  applying the sequence of data blocks to a plurality of decipher functional modules sequentially coupled to operate sequentially on the sequence of data blocks,
  each decipher functional module comprising
    a module input,
    a module output, and
    a respective data processing unit having a parallel input and a corresponding parallel output and being arranged to perform a respective reversible process upon a set of bits at its parallel input and to produce at its corresponding parallel output a corresponding enciphered set of bits; and
  configuring each decipher functional module to couple a respective predetermined set of the bits of a data block received at its module input to the parallel input of its data processing unit and to provide at its module output a deciphered data block in which said respective predetermined set of bits is replaced by the corresponding deciphered set of bits produced at the parallel output of its data processing unit.

61. A method according to claim 60, wherein the decipher functional modules are of a single type.

62. A method according to claim 60, wherein the reversible process of at least one of said data processing units is a switching operation controlled by at least one of the bits of a data block received at its parallel input.

63. A method according to claim 60, wherein each of said plurality of decipher functional modules acts as a reversible gate.

64. A method according to claim 60, wherein the configuring of each of said plurality of decipher functional modules is in accordance with a cipher design description.

65. A method according to claim 64, including receiving said cipher design description.

66. A method according to claim 64, including generating said cipher design description.

67. A method according to claim 64, including generating random or pseudo-random numbers and using the generated random or pseudo-random numbers to generate said cipher design description.

68. A method according to claim 67, wherein a respective generated random or pseudo-random number is used to describe in code the respective predetermined set of bits for a respective decipher functional module.

69. A method according to claim 68, wherein the logic operations do not conserve logic.

70. A method according to claim 60, wherein each of said plurality of decipher functional modules comprises a programmable logic gate array and the configuring step includes programming said programmable logic gate array.

71. A method according to claim 60, implemented by computer code on a computing apparatus, wherein each of said plurality of decipher functional modules comprises a computer code routine implemented in dependence upon configuration information.

72. A method according to claim 71, wherein the computer code routine is implemented repeatedly dependent upon the number of said decipher functional modules to be implemented.

73. A method according to claim 60, including selecting the type of decipher functional module to be used from amongst a plurality of possible types of decipher functional modules.

74. A method according to claim 60, including selecting the number of said plurality of decipher functional modules used.

75. A method according to claim 60, including selecting the respective predetermined set of bits of a received data block for each of said plurality of decipher functional modules.

* * * * *